July 31, 1934.    V. G. APPLE    1,968,583
VEHICLE BRAKE
Original Filed April 8, 1929
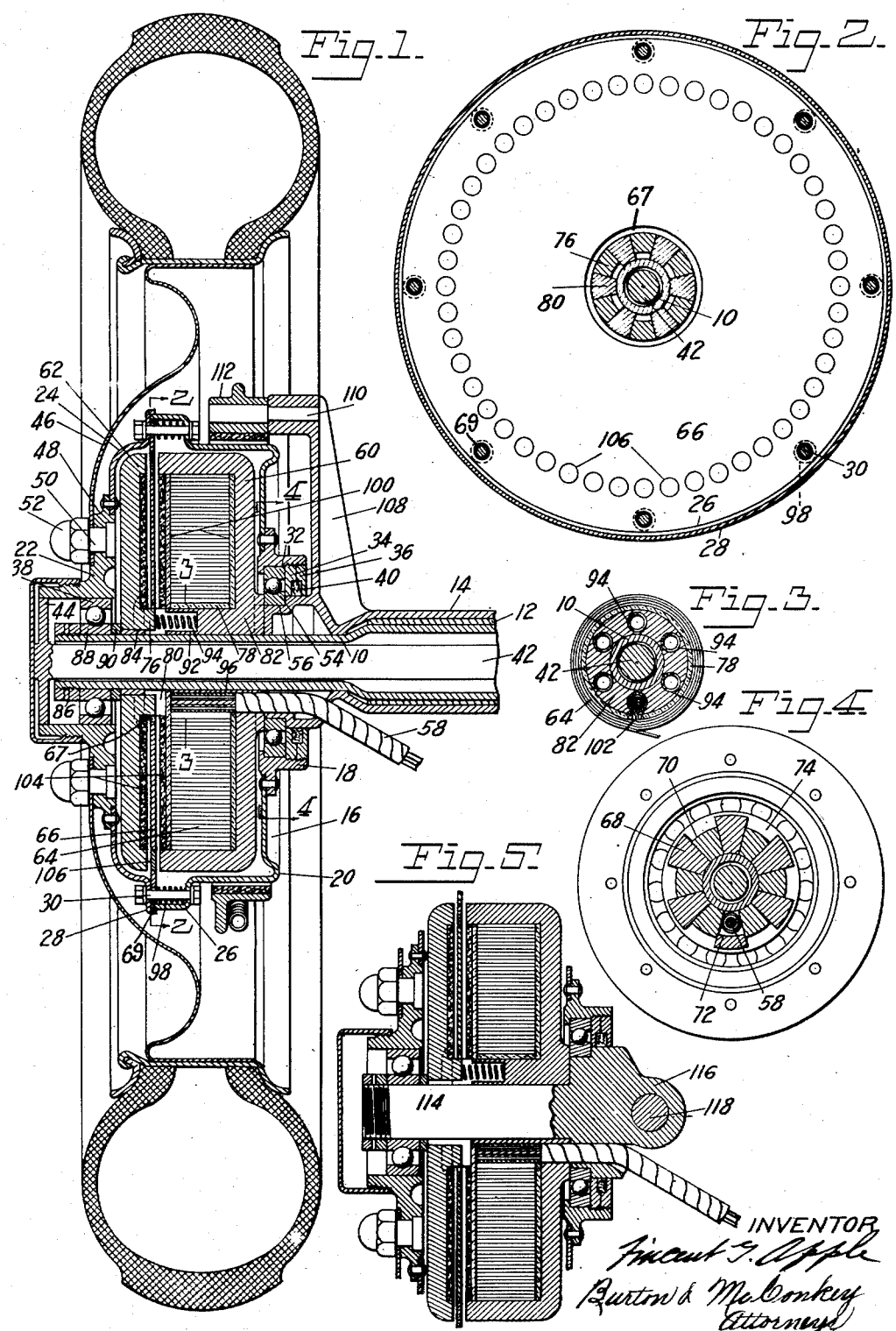

Patented July 31, 1934

1,968,583

UNITED STATES PATENT OFFICE 1,968,583

VEHICLE BRAKE

Vincent G. Apple, Dayton, Ohio, assignor to Bendix Brake Company, South Bend, Ind., a corporation of Illinois Application April 8, 1929, Serial No. 353,282
Renewed December 23, 1933

25 Claims. (Cl. 188—164)

My invention relates to improvements in vehicle brakes, and particularly electric brakes for automotive vehicles. An object is to provide braking mechanism which is completely enclosed within the wheel hub and arranged between its two bearings, the diameter of the hub however being considerably enlarged to accommodate the same.

Another object is to so construct the braking mechanism that no adjustment for wear need be made during the life of the braking parts.

Another object is to so arrange the friction elements of the brake as to insure against accidental friction therebetween when the brake is in its normal inoperative position.

Certain meritorious features of my invention reside in the provision of electro-magnetic brake mechanism enclosed within a drum carried by the vehicle wheel and rotatable about a non-rotative shaft, provided with a conductor extending into the drum through an enlarged hub which serves as a bearing for the drum; in the provision of electro-magnetic brake mechanism including a core and an armature arranged non-rotatably upon a shaft within a drum rotatable about the shaft, which drum encloses a friction disc rotatable therewith and arranged between said armature and the core and adapted to be urged by electro-magnetic action into frictional engagement to retard the rotation of the drum, and which friction disc is axially and tiltably shiftable within the drum, and which armature is axially shiftable within the drum to grip the friction disc between the armature and the core.

Means are provided to determine the idle supported position of the armature and the core and these idle supported positions are maintained notwithstanding wear of the parts.

These and many other objects are attained in the structure hereinafter described, reference being made to the accompanying drawing wherein—

Fig. 1 is an axial section through an automotive wheel embodying my invention.

Figs. 2, 3, and 4 are transverse sections taken at 2—2, 3—3, and 4—4 respectively.

Fig. 5 shows how my braking mechanism is applied to the front wheel of a vehicle.

In the drawing I show my invention as applied to an automotive rear axle of the full floating type where the tubular spindle 10 extends into the end of the axle tube 12 which is in turn surrounded by the cast member 14. Parts 10, 12, and 14, are riveted or otherwise secured together.

The rotative bearing housing 16 which supplants the usual wheel hub is composed of several parts, namely, a flanged metal hub 18, a drawn sheet metal shell 20 riveted or otherwise secured to hub 18, another flanged metal hub 22 and a drawn sheet metal shell 24 riveted or otherwise secured to hub 22. The outer larger diameter 26 of shell 20 dowels into a turned over edge 28 of shell 24 to keep the several parts in axial alignment, and bolts 30 hold the two shells together.

The outer race 32 of the inner ball bearing is rigidly secured in hub 18 by nut 34 and lock nut 36 while the outer race 38 of the outer ball bearing has free axial movement in hub 22. A felt washer 40 is confined in the recess between nut 34 and lock nut 36.

The live axle 42 has an integral clutch flange 44 in toothed contact with the end of hub 22 to drive the wheel. A disc wheel 46 is secured to flange 48 of hub 22 by studs 50 and nuts 52 substantially as in common practice. It will be seen that the bearing housing 16 composed of parts 18, 20, 22, and 24, functions substantially as does the full floating hub of standard design.

By selecting for the inner bearing a ball bearing of large bore for its capacity and mounting its inner race 54 on a turned hub 56 of cast member 14, space may be had between the inner race 54 and tubular spindle 10 to pass one or more cables 58 whereby current may be conveyed to the interior of housing 16 while it is being rotated.

The electrically operable braking mechanism, enclosed in housing 16 comprises a non-rotatable axially fixed magnet core 60, a non-rotatable axially movable armature 62, an electric coil 64 to magnetically energize the magnet core and the armature to axially move the armature toward the magnet and a disc 66, adapted to rotate with the housing 16 but having a limited axial movement therein, extending inwardly between magnet 60 and armature 62.

In order to prevent rotation of magnet core 60 about spindle 10 a series of integral clutch teeth 68 extend axially from the core into a corresponding series 70 cut on the end of hub 56 of cast member 14 (see Fig. 4). Part of one of the teeth 68 is cut away as at 72 to make room for the passage of cable 58. Teeth 68 are cut from a hub of larger diameter than hub 56 so that their outer edges may bear against the inner race 54 of the inner bearing to hold it in place.

The armature 62 is held against rotation on spindle 10 by a series of axially extending clutch teeth 76 at its inner diameter, which engage a corresponding series of teeth 80 on the end of hub 82 of magnet core 60 (see Fig. 2). The armature teeth 76 extend into the spaces between the magnet core teeth 80 to a considerable depth so that limited axial movement of armature 62 will not withdraw the teeth from engagement.

The magnet core 60 fits spindle 10 snugly while the armature 62 is bored to a sliding fit over a short spacing tube 84. When nuts 86 are tightened, inner race 88 presses against washer 90 which presses against spacing tube 84 which in turn presses against the ends of the teeth 80 of the magnet core whereby these parts are all held against axial movement, while the armature 62 may have free axial movement over tube 84, its movement being limited in one direction by washer 90 and in the other direction by disc 66.

Midway between the teeth 80 of magnet core 60 holes 92 are drilled for springs 94. These springs bear against the ends of teeth 76 and urge armature 62 outwardly against washer 90. Between one pair of the teeth 80 the hole 92 is extended all the way through the hub 82 as at 96, and the cable 58 is brought in through this hole.

Bolts 30 which hold the two halves of housing 16 together pass freely through a friction disc 66 whereby the disc is rotated in unison with the housing and springs 98 surrounding bolts 30 keep the disc shifted axially against shell 24 which locates it midway of, and out of contact with, magnet 60 and armature 62 so that in the inoperative position shown the disc may revolve without encountering resistance. The disc is shiftable axially within the drum and is tiltable within the drum upon the bolts 30 as hereinafter described.

Coil 64 is kept out of contact with the side of core 60 by a layer 100 of insulation. A similar layer covers the opposite side of the coil. A ring 78 of insulation surrounds hub 82, and the inner turn of the coil passes through a slot 102 in this ring and surrounds the end of cable 58, to which it is joined by soldering, brazing, welding or similar means. The outer turn of coil 64 is grounded on magnet core 60. In practice the coil 64 is preferably sealed against oil by molding the top layer 100 over the coil after it is in place on the core.

Facings 104 of a material having a high coefficient of friction may be secured to armature 62 and magnet core 60 by molding them in place, or by riveting or other means. These facings, together with disc 66 and shell 24 are preferably composed of non-magnetizable material so that the magnetic flux will circulate through the magnet core and armature with minimum leakage.

Where disc 66 is of non-magnetizable material a circular row of inserts 106 of magnetizable material will improve the magnetic circuit and add to the magnetic effect.

From the foregoing it will be apparent that if a source of electrical energy such as a battery having one terminal grounded, has its live terminal connected to cable 58 current will be supplied to coil 64, non-rotative armature 62 will be drawn toward non-rotative core 60, clamping rotating disc 66 between them to exert a retarding effect upon the rotation of the drum.

When the electric circuit is broken springs 94 seat armature 62 against washer 90 and springs 98 seat rotating disc 66 against shell 24 whereby the disc is held midway between the stationary elements and no dragging action results when the brake is not in use.

Because of the inserts 106 the magnetic circuit is completely closed when braking is taking place, and since the ultimate pull of a magnet comes just as it completely closes, this pull will be had whether the magnetic parts are clamping a rotating disc of full thickness or one worn considerably thinner. This feature is highly important because ordinary brakes have more or less inaccessible adjusting means which are more or less difficult to maintain in exact adjustment since a wearing away of the friction elements varies the braking effect.

The fully enclosed feature is also highly important since ordinary brakes vary in their braking effect depending upon whether dirt, water or oil is at the moment between the friction elements. Entire uniformity of action is had in my improved brake since it is filled with oil or grease suitable to the bearings and the materials of the friction elements are determined accordingly.

Where a mechanically operable emergency or parking brake is desirable it may be had by providing a rearwardly extending arm 108 integral with cast member 14 carrying a stud 110 which in turn supports the external brake band 112. Where such a brake is undesirable a transmission brake may be substituted.

Fig. 5 shows how the same mechanism appearing in Figs. 1 to 4 may be adapted to a front wheel. In Fig. 5 the spindle 114, knuckle 116, and pin 118 replace the spindle 10, shaft 42, clutch 44, etc. Since parking brakes are not usually employed on the front wheels the arm 108, stud 110 and band 112 are omitted.

While I have shown how my improved brake may be applied to a full floating rear axle and how it may be modified for a front axle it is to be understood that further modifications may be made to apply it to other purposes. For example, the removal of a drive shaft 42, and of the parking brake parts 108, 110 and 112 makes the brake shown in Fig. 1 particularly applicable to trailers where the design of a control involving mechanical connections to the brakes is difficult of attainment, and while I have employed a structure wherein a single revolving disc having two active surfaces coacts with two surfaces, one on each non-rotative member, it is obvious that the number of frictional surfaces may be increased if desired by providing a structure similar to a multiple disc clutch.

It will be noted that the central aperture 67 of the friction disc 66 is sufficiently large to provide clearance around the outside circumference of the teeth 76 of armature 62, over which teeth the said disc is adapted to slide axially during operation of the brakes. It will likewise be noted that the spaced apart apertures around the periphery of the said friction member 66 through which the retaining pins 30 extend are sufficiently large in diameter to permit a small clearance 69. By virtue of these two clearances it is possible for the friction disc 66 to tilt somewhat out of the vertical plane on its mounting. This is desirable inasmuch as the wear on friction facings 104 may vary somewhat on either side of disc 66, or one of the friction facings may wear down unevenly at various portions of its periphery for which reason friction disc 66 should be so mounted that it is free to tilt slightly out of its normal vertical plane.

I claim:

1. Vehicle braking mechanism comprising, in combination, a non-rotative shaft, a hollow drum having a rotatable bearing at each end upon the shaft, and an electro magnetic brake arranged within the drum to retard its rotation.

2. Vehicle braking mechanism comprising, in combination, a non-rotative shaft, a hollow drum rotatably supported upon the shaft, non-rotative elements including an electro magnet arranged within the drum on the shaft and held against rotation thereon, and a member between said elements within the drum secured thereto for rotation therewith adapted to be brought into contact with the non-rotative elements by said magnet to retard the rotation of the drum.

3. Vehicle braking mechanism comprising, in combination, a non-rotative axle, a wheel rotatably supported thereon, a hollow drum rotatable with the wheel, non-rotative elements including an electro magnet arranged within the drum on the axle and held against rotation thereon, and a friction member between said elements within the drum secured thereto for rotation therewith and adapted to be brought into contact with said non-rotative elements by said magnet to retard the rotation of the drum.

4. Vehicle braking mechanism comprising, in combination, a non-rotatable axle, a wheel rotatable on the axle, a hollow hub on the wheel having a bearing at each end upon the axle, non-rotative elements including an electro-magnet arranged within the hub surrounding the axle and secured against rotation thereabout, and a friction member within the hub secured thereto for rotation therewith but adapted to be moved by said magnet axially into contact with the non-rotative elements to retard the rotation of the wheel.

5. Vehicle braking mechanism comprising, in combination, a non-rotatable shaft, a hollow drum rotatable about the shaft, non-rotative elements including an eletro-magnet arranged within the drum surrounding the shaft, and a friction member arranged between said elements within the drum for rotation therewith adapted to be moved axially into contact with said non-rotative elements by said magnet to retard rotation of the drum.

6. Vehicle braking mechanism comprising, in combination, a non-rotative shaft, a hollow drum rotatable about the shaft, an electro-magnet and an armature held against rotation about the shaft within the drum but adapted to be drawn toward each other, and a friction member arranged within the drum for rotation therewith extending between the magnet and the armature to frictionally engage them when they are drawn toward each other whereby rotation of the drum is retarded.

7. Vehicle braking mechanism comprising, in combination, a non-rotatable shaft, a hollow drum rotatable about the shaft, an electro-magnet and an armature held against rotation about the shaft within the drum but adapted to be drawn toward each other, and a friction member arranged within the drum for rotation therewith extending between the magnet and the armature to frictionally engage them when they are drawn toward each other whereby rotation of the drum is retarded, said friction member being shiftable axially within the drum.

8. Vehicle braking mechanism comprising, in combination, a non-rotatable shaft, a hollow drum rotatable about the shaft, an electro-magnet and an armature held against rotation about the shaft within the drum but adapted to be drawn toward each other, and a friction member arranged within the drum for rotation therewith extending between the magnet and the armature to frictionally engage them when they are drawn toward each other whereby rotation of the drum is retarded, said friction member being shiftable axially within the drum and tiltable with respect thereto.

9. Vehicle braking mechanism comprising, in combination, a non-rotatable shaft, a hollow drum rotatable about the shaft, an electro-magnet and an armature held against rotation about the shaft within the drum but adapted to be drawn toward each other, and a friction member arranged within the drum for rotation therewith extending between the magnet and the armature to frictionally engage them when they are drawn toward each other whereby rotation of the drum is retarded, said friction member having a magnetizable portion interposed between the electro magnet and the armature.

10. Vehicle braking mechanism comprising, in combination, a non-rotative shaft, a drum rotatable about the shaft, an electro magnet and an armature arranged within the drum about the shaft and held against rotation thereon but one of which is adapted to be moved toward the other, a friction disc arranged within the drum to rotate therewith extending between said armature and electro magnet and shiftable axially and tiltably with respect to the drum, yielding means holding said armature and electro magnet apart, yielding means holding said friction discs normally supported from both the armature and the electro magnet.

11. Vehicle braking mechanism comprising, in combination, a non-rotative shaft, a drum rotatable about the shaft, an electro magnet and an armature arranged within the drum about the shaft and held against rotation thereon, said armature movable toward the electro magnet, a friction disc arranged within the drum to rotate therewith extending between the armature and electro magnet, a rigid stop determining the idle position of the armature and yielding means holding the armature against said stop away from the electro magnet.

12. Vehicle braking mechanism comprising, in combination, a non-rotative shaft, a drum rotatable about the shaft, an electro magnet and an armature arranged within the drum about the shaft and held against rotation thereon, said armature movable toward the electro magnet, a friction disc arranged within the drum to rotate therewith extending between the armature and electro magnet and shiftable axially therebetween, a rigid stop determining the idle position of the armature, yielding means holding the armature against said stop and away from the electro magnet, a rigid stop determining the idle position of the disc within the drum between the armature and the electro magnet, and yielding means holding the disc against said stop supported from both the electro magnet and the armature.

13. Vehicle braking mechanism comprising, in combination, a non-rotatable shaft, a hollow drum rotatable about the shaft, a magnet core within the drum surrounding the shaft secured against rotative and axial movement thereon, an armature surrounding the shaft and secured against rotation but having limited axial movement thereon, a winding about the core adapted to be electrically energized to move the armature axially toward the core, and a friction disc secured within the drum for rotation therewith extending between the magnet core and the armature to frictionally engage the surfaces thereof when they are drawn together whereby rotation of the drum is retarded.

14. Vehicle braking mechanism comprising, in combination, a non-rotatable shaft, a hollow drum rotatable about the shaft, a magnet core within the drum surrounding the shaft and secured against rotative and axial movement thereon, an armature surrounding the shaft and secured against rotation but having limited axial movement thereon, a winding about the core adapted to be electrically energized to move the armature axially toward the core, a friction disc secured within the drum for rotation therewith extending between the magnet core and the armature to frictionally engage the surfaces thereof when they are drawn together, resilient means to press said armature against a suitably located shoulder on said shaft, resilient means to position the disc with respect to the drum between the core and the armature when no electrical energy is being applied.

15. Vehicle braking mechanism comprising, in combination, a non-rotatable shaft, a hollow drum rotatable about the shaft, a core of magnetic material within the drum surrounding the shaft and secured against rotative and axial movement thereon, an armature of magnetic material surrounding the shaft and secured against rotation but having limited axial movement thereon, a winding about the core adapted to be electrically energized to move said armature axially toward the core, and a friction disc of non-magnetic material within the drum secured thereto for rotation therewith extending between the magnet core and the armature to frictionally engage the surfaces thereof when they are drawn together, said friction disc having inserts of magnetic material arranged between the core and the armature.

16. Vehicle braking mechanism comprising, in combination, a non-rotatable shaft having an enlarged hub at one end, a hollow drum having rotative bearing at one end on the shaft and at the other end on the hub, electro-magnetic means within the drum to retard the drum, an axially extending opening through the hub radially inwardly of the bearing of the drum thereon, and a conductor extending through said opening into the drum to convey current to said electro-magnetic means.

17. In combination with brake mechanism of the class described, an integral rotatable drum closed at each end, a pair of friction members secured against rotation therein in spaced apart relationship, one of said members being axially movable within the drum, a friction plate secured to said drum, and means constituting a body portion of one of said non-rotatable friction members operable to draw said movable friction member axially to clamp the friction disc between them.

18. In combination with brake mechanism of the class described, a rotatable closed drum, a friction disc mounted within said drum to rotate therewith, a friction member secured against rotation within said drum on each side of said friction disc, and electro-magnet means integral with one of said non-rotatable members for moving one of said members axially of said drum to clamp the friction disc between the members.

19. In combination with brake mechanism of the class described, an integral rotatable closed drum, a friction disc mounted within said drum to rotate therewith, a friction member secured against rotation within said drum on each side of said friction disc, means integral with one of said members for moving the other axially of said drum to clamp said friction disc between the members, and means for retaining said friction members and friction disc in normally spaced relationship.

20. Brake mechanism comprising, in combination, a stationary shaft, a closed drum rotatable upon said shaft, axially spaced apart brake friction discs secured to the shaft against rotation within the drum, a brake friction disc arranged between said stationary friction discs and secured peripherally to the drum to rotate therewith and tiltable out of its normal plane with the drum, and means integral with one of said stationary discs operable to bring said several friction discs together to retard the rotation of the drum.

21. Brake mechanism comprising, in combination, a stationary shaft, a closed drum rotatable upon said shaft, a brake friction disc peripherally secured to the drum to rotate therewith spaced from both sides of the drum and tiltable out of its normal plane within the drum, retarding means arranged within the drum on opposite sides of said disc, and mechanism integral with said retarding means operable to bring said disc and retarding means into braking engagement to retard the rotation of the drum.

22. Brake mechanism comprising, in combination, a stationary shaft, a closed brake drum rotatably supported at both ends upon the shaft, cooperating brake friction members arranged entirely within the drum and secured in part to rotate therewith and in part against rotation to the shaft, and electric control mechanism within said closed drum operable to bring said brake friction members together to retard the rotation of the drum.

23. Brake mechanism comprising, in combination, a stationary shaft, a closed brake drum rotatably supported at both ends upon the shaft, cooperating brake friction members arranged entirely within the drum and secured in part to rotate therewith and in part against rotation to the shaft, and electric control mechanism within said closed drum operable to bring said brake friction members together to retard the rotation of the drum including a control element extending through the shaft interiorly of the rotatable support for the drum thereon.

24. Brake mechanism comprising, in combination, a stationary shaft, a closed brake drum rotatably supported at both ends upon the shaft, cooperating brake friction members arranged entirely within the drum and secured in part to rotate therewith and in part against rotation to the shaft, and electric control mechanism within said closed drum operable to bring said brake friction members together to retard the rotation of the drum including an electric control element extending from within the drum axially outwardly through the shaft interiorly of the bearing for one end of the drum upon the shaft.

25. Brake mechanism comprising, in combination, a stationary shaft, a closed brake drum rotatably supported at both ends upon the shaft, cooperating brake friction members arranged entirely within the drum and secured in part to rotate therewith and in part against rotation to the shaft, and electric control mechanism within said closed drum operable to bring said brake friction members together to retard the rotation of the drum and supplemental brake friction means having a part operable to engage a brake friction surface carried by the drum and being remote from that friction surface of the drum which cooperates with the said brake friction members arranged entirely within the drum.

VINCENT G. APPLE.